United States Patent
Wong et al.

(10) Patent No.: US 6,380,322 B1
(45) Date of Patent: Apr. 30, 2002

(54) REWORKABLE HIGH TEMPERATURE ADHESIVES

(75) Inventors: Ching-Ping Wong, Berkeley Lake; Jiali Wu, Atlanta, both of GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/335,082

(22) Filed: Jun. 17, 1999

Related U.S. Application Data

(60) Provisional application No. 60/090,052, filed on Jun. 19, 1998.

(51) Int. Cl.$^7$ .............................................. C09J 163/00
(52) U.S. Cl. ...................... 525/423; 525/476; 525/505; 525/533
(58) Field of Search ................................ 525/423, 476, 525/505, 533

(56) References Cited

U.S. PATENT DOCUMENTS

| | | | |
|---|---|---|---|
| 3,635,894 A | * | 1/1972 | Dowbenko |
| 4,797,466 A | | 1/1989 | Oikawa et al. |
| 4,931,531 A | | 6/1990 | Tamai et al. |
| 5,002,818 A | | 3/1991 | Licari et al. |
| 5,268,048 A | | 12/1993 | Leibovitz et al. |
| 5,276,106 A | * | 1/1994 | Portelli |
| 5,457,149 A | * | 10/1995 | Hall |
| 6,172,141 B1 | | 1/2001 | Wong et al. |
| 6,180,696 B1 | * | 1/2001 | Wong |

OTHER PUBLICATIONS

Smith "Metal Acetylacetonates as Latent Accelerators . . . " Journal of Applied Polymer Science vol. 26 pp. 979–986; 1981.*

Lee *Handbook of Epoxy Resins* pp. 4–36 to 4–56; 1967.*

Hergenrother, P.M., High–Temperature adhesives, Chemtech, Aug. 1984.

Ying, Lincoln, A. Reworkable High Reliability Thermoplastic Die Attach Adhesive, M & T Chemicals Inc., Specialty Polyimide Group, Rahway, New Jersey.

Shaw, S.J. and Kinloch, A.J., High Temperature Adhesives, The International Adhesion Conference, 1984.

* cited by examiner

*Primary Examiner*—David J. Buttner
(74) *Attorney, Agent, or Firm*—Todd Deveau; Charles Vorndran; Troutman Sanders LLP

(57) ABSTRACT

A reworkable high temperature adhesive, comprising the reaction product of (a) a thermoplastic adhesive selected from the group consisting of polyetherimides, polyamide-imides, polysulfones, polyethersulfones, silicon-carbon thermosets, polyphenylene sulfides and mixtures thereof; (b) a metal acetonate; (c) an epoxy resin; (d) a crosslinker; (e) and a catalyst.

46 Claims, No Drawings

REWORKABLE HIGH TEMPERATURE ADHESIVES

STATEMENT OF RELATED APPLICATIONS

This application claims priority of copending provisional application Serial No. 60/090,052, filed Jun. 19, 1998.

BACKGROUND OF THE INVENTION

1. Field of the Invention

The present invention is concerned generally with reworkable high temperature adhesives. More specifically, MCM-D assembly with working temperatures in excess of 350–400° C.

2. Description of Related Art

Large area substrate processing is a key solution to improving the productivity of Multi-Clip Module Deposition (MCM-D) technology. The trend of achieving high performance and miniaturizing electronic packaging drives the development of multi-chip module-deposition (MCM-D) technology. However, the high cost of production limits the widespread use of MCM-D technology. One approach to overcoming this limitation is to expand the existing scale (12×12 $in^2$) of large processing and reuse the costly pallet (carrier substrate) to achieve cost reduction.

Newly developed MCM-D design techniques involve a fully operational process line using a 24×24 $in^2$ carrier or pallet. During this process, several silicon tiles (8×8 $in^2$) are to be adhered to a large reusable pallet (24×24 $in^2$), followed by micromechanical fabrication, thin film passivation deposition, and subsequent detachment of the silicon tiles from the pallet. The total weight of each tile-to-pallet assembly is restricted to 10 lbs and the total thickness should be less than 6.25 mm. To achieve this design, a unique high temperature adhesive is needed that remains thermally stable at processing temperature (working temperature in excess of 350–400° C.), and then thermally degrades at a slightly higher temperature (reworkable temperature) for silicon tile detachment from the pallet.

Polymeric adhesives are used extensively in present engineering applications due to their attributes of allowing a more uniform stress distribution and a more CTE mismatching material assembly. Among them, epoxy resin and polyimide are two kinds of widely applied adhesives. Polyfunctional epoxies have good adhesion property and can produce cured products having a glass transition temperature (Tg) in excess of 200° C. However, even the most highly crosslinked epoxies are unable to tolerate long-term service at temperatures at or above 175° C. owing to their intrinsic molecular structure. Although polyimide adhesives can resist high temperature environments in excess of 600° C. for short periods, their intractability, solvent volatility, low adhesion strength and water condensation byproduct during cure greatly restrict their application. Therefore, both of these two classic adhesives can not meet the MCM-D requirements.

Lincoln Ying, et al. disclosed thermoplastic polyimide-based reworkable adhesives as die attach for hybrid integrated circuit manufacturing. However, the working temperature window of this type of thermoplastic material is only from room temperature to 275° C. Current polymeric high temperature adhesives are predominately polyimide-based that are not reworkable, which places an obstacle to removing the coated substrates from the tile-to-pallet assembly and to reusing the high cost pallets.

SUMMARY OF THE INVENTION

The present invention overcomes the above disadvantages by providing reworkable high temperature adhesives, which are not only reworkable at certain required temperatures, but also resist the severe corrosive environment of the MCM-D substrate fabrication and passivation process. The adhesives incorporate a thermally cleavable block in the polymerized chains of the adhesives which allows the thermoset network to be reworkable in a weak acid medium.

The adhesive material is obtained by reacting a thermoplastic adhesive selected from the group consisting of polyetherimides, polyamide-imides, polysulfones, polyethersulfones, silicon-carbon thermosets, polyphenylene sulfides and mixtures thereof, (b) a metal acetonate; (c) an epoxy resin; (d) a crosslinker; and (e) a suitable catalyst.

The adhesives of the present invention are formulated to meet the adhesion, viscosity, thermal stability, and reworkability requirements of MCM-D production.

Accordingly, it is an object of the present invention to provide reworkable adhesives for MCM-D assembly with a working temperature in excess of 350–400° C.

DETAILED DESCRIPTION OF A PREFERRED EMBODIMENT

The present invention may be understood more readily by one skilled in the art by reference to the following detailed description of a preferred embodiment of the invention.

The term "alkyl" as used herein refers to a branched or unbranched saturated hydrocarbon group of 1 to 24 carbon atoms, such as methyl ("Me"), ethyl ("Et"), n-propyl iso-propyl n-butyl, isobutyl, t-butyl, octyl decyl and the like. Preferred alkyl groups herein contain from 1 to 12 carbon atoms.

The term "effective amount" of a compound, product, or composition as provided herein means a sufficient amount of the compound, product or composition to provide the desired results. As will be pointed out below, the exact amount required will vary from substrate to substrate, depending on the particular compound, product or composition used, its mode of application, and the like. Thus, it is not always possible to: specify an exact "effective amount." However, an appropriate effective amount may be determined by one of ordinary skill in the art using only routine experimentation.

As used herein, the term "suitable" is used to refer to a moiety which is compatible with the compounds, products, or compositions as provided herein for the stated purpose. Suitability for the stated purpose may be determined by one of ordinary skill in the art using only routine experimentation.

As used herein, the term "substituted" is used to refer, generally, to a carbon or suitable heteroatom having a hydrogen or other atom removed and replaced with a further moiety. Moreover, it is intended that the term "substituted" refers to substitutions which do not change the basic and novel utility of the underlying compounds, products or compositions of the present invention.

The adhesives of the present invention are obtained as the reaction product of a thermoplastic adhesive, a metal acetonate, an epoxy resin, a crosslinker, and a catalyst. The resulting adhesives are stable at temperatures up to 350–400° C., and are reworkable at temperatures of 400–450° C.

The thermoplastic adhesives of the present invention are any one of the well-known thermoplastic polymers. Suitable polymers include, polyetherimides, polyamide-imides, polysulfones, polyethersulfones, silicon-carbon thermosets, and polyphenylene sulfides. The following is by way of example only and is not meant to be limiting to the particular members of the group exemplified.

Polyetherimide is commercially available as ULTEM (from GE) and has the general structure:

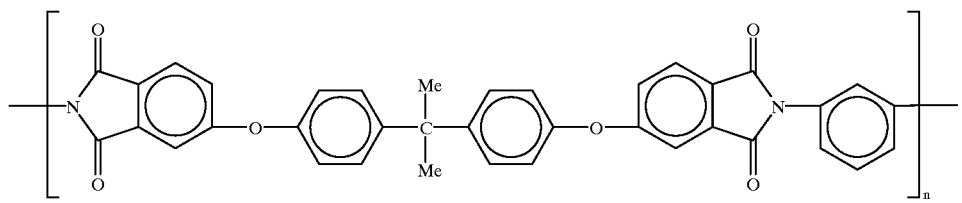

wherein n>1. Other suitable polyetherimides are known to or will be readily apparent to those skilled in the art without undue experimentation.

Polyamide-imides suitable for use in this invention are disclosed in U.S. Pat. No. 3,615,913, incorporated herein by reference and made a part hereof and have the following generic structure:

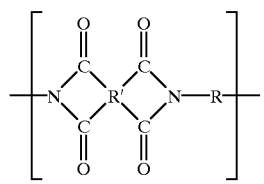

wherein R' and R are as defined in U.S. Pat. No. 3,615, 913. In short, R' is a tetravalent radical containing at least one six-member aromatic carbon ring and R is a divalent radical containing an amid group.

Polysulfones and polyethersulfones are commercially available under the tradenames UDEL (from Amoco), and ULTRASON S (from BASF), VICTREX (from ICI), and ULTRASON E (from BASF). Other suitable polysulfones and polyethersulfones will be apparent to those skilled in the art.

Suitable silicon-carbon thermosets are available under the tradename SYLCAR and have the general structure:

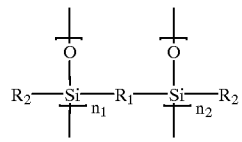

where $R_1$ and $R_2$ are substituted or unsubstituted alkyl or aryl radicals. Other silicon-carbon thermosets suitable for use in this invention will be apparent to those of skill in the art.

Suitable polyphenylene sulfide thermoplastics useful in the present invention are available commercially under the tradenames RYTON (from Phillips), FORTRON (from Hoechst Celanese), TEDUR (from Bayer), and SUPEC (from GE) and have the general structure:

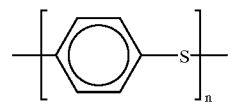

where r>1.

The preferred adhesive is a polyimide-amide commercially available as TORLON (from Amoco) having the structure:

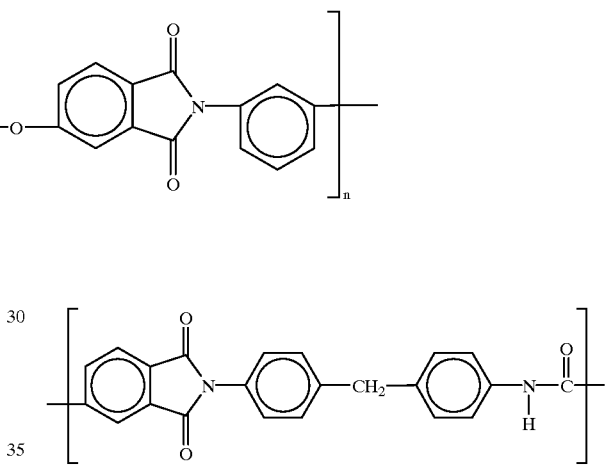

Use of a polyetherimde as the thermoplastic adhesive in the present invention results in an adhesive that is more stable at higher temperatures than those incorporating polymide-amides, but may lack the superior adhesive properties of those using the polyimide-amide.

Suitable metal acetonates for the present invention are of the general formula: $[R_1 \text{ COCH}=C(O^-)R_2]_x \text{ M}^{x+}$; where $M^{x+}$ is selected from the group consisting of metals; X is the ligancy of $[R_1 \text{ COCH}=C(O^-)R_2]$ to $M^{x+}$ and is also the number of positive charge of M and is 1 to 6; and $R_1$ and $R_2$ selected independently from the group consisting of H, substituted or unsubstituted alkyl, alkyl substituted with phenyl, phenyl, substituted or unsubstituted phenyl substituted with alkyl, and acetyl. Suitable metals include Group IA–VIA metals and Group IB–VIIIB metals (specifically, elements Nos. 3, 4, 11–13, 19–31, 37–50, 55–83, and 87 or higher). The preferred metal is copper (II). The preferred metal acetonates are metal acetylacetonates. More preferred are copper (II) benzoacetylacetonate and copper (II) acetylacetonate, with copper (II) benzoacetylacetonate being the most preferred.

Suitable epoxy resins include cycloaliphatic epoxys, bisphenol A, bisphenol F, novolac resins, and compounds of the general formula:

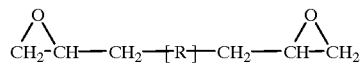

where R is selected from the group consisting of

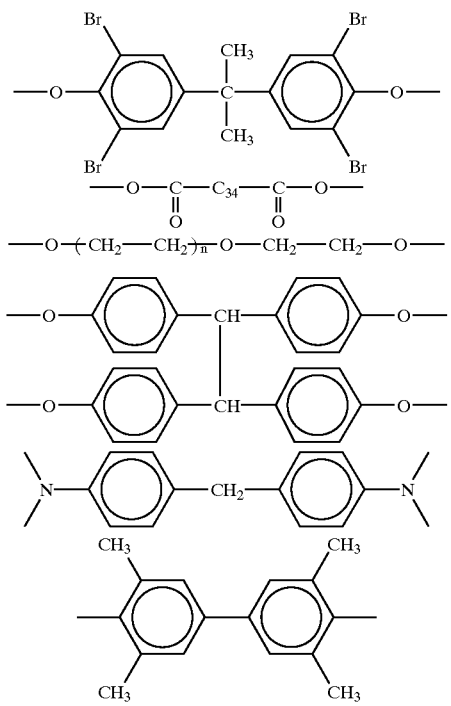

The preferred epoxy resins are cycloaliphatic epoxy resins.

The cycloaliphatic type epoxides employed as the preferred epoxy resin ingredient in the invention are selected from non-glycidyl ether epoxides containing more than one 1,2 epoxy group per molecule. These generally are prepared by epoxidizing unsaturated cyclic hydrocarbon compounds, such as cyclo-olefins, using hydrogen peroxide or peracids such as peracetic acid and perbenzoic acid. The organic peracids generally are prepared by reacting hydrogen peroxide with either carboxylic acids, acid chlorides or ketones to give the compound R—COOOH. These materials are well known in the art and reference may be made to Brydson, J., *Plastic Materials* (1966) 471, incorporated herein by this reference and made a part hereof for their synthesis and description.

Such non-glycidyl ether cycloaliphatic epoxides are characterized by having a ring structure wherein the epoxide group may be part of the ring or may be attached to the ring structure. These epoxides also may contain ester linkages. The ester linkages generally are not near the epoxide group and are relatively inert to reactions.

Examples of non-glycidyl ether cycloaliphatic epoxides include 3,4-epoxycyclohexylmethyl-3,4-epoxycyclohexane carboxylate (containing two epoxide groups which are part of the ring structures, and an ester linkage); vinylcyclohexene dioxide (containing two epoxide groups, one of which is part of a ring structure); 3,4-epoxy-6-methyl cyclohexyl methyl-3,4-epoxycyclohexane carboxylate and dicyclopentadiene dioxide, having the following respective structures:

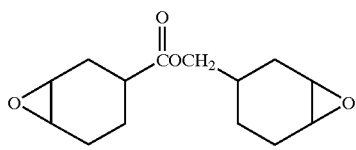

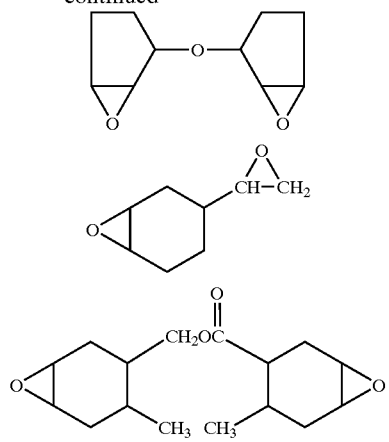

A distinguishing feature of many of the cycloaliphatic epoxides of the present invention is the location of the epoxy group(s) on a ring structure rather than on an aliphatic side chain. Generally, the cycloaliphatic epoxide particularly useful in this invention will have the formula selected from the group consisting of:

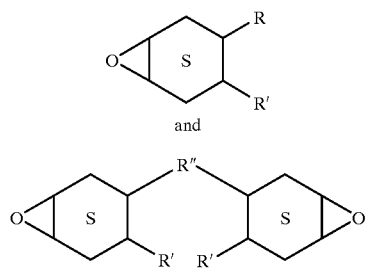

where S stands for a saturated ring structure; R is selected from the group consisting of $CHOCH_2$, $O(CH_2)_nCHOCH_2$ and $OC(CH_3)_2CHOCH_2$ radicals where n=1 to 5; R' is selected from the group consisting of hydrogen, methyl ethyl, propyl, butyl, and benzyl radicals; and R" is selected from the group consisting of O, $CH_2OOC$, and $CH2OOC(CH2)4COO$ radicals.

These cycloaliphatic epoxy resins may be characterized by reference to their epoxy equivalent weight, which is defined as the weight of epoxide in grams which contains one equivalent of epoxy. Suitable cycloaliphatic epoxy resins have a preferred epoxy equivalent weight from about 50 to about 250. They generally will have a viscosity between about 5 to about 900 cps at 25 degrees C.

Examples of suitable cycloaliphatic epoxides which are known in the art are suggested in U.S. Pat. Nos. 5,194,930; 3,207,357; 2,890,194; 2,890,197; and 4,294,746, disclosures of which are incorporated herein by this reference and made a part hereof. Some specific examples of suitable cycloaliphatic epoxides are: 3,4-epoxycyclohexylmethyl-3, 4-epoxycyclohexane carboxylate available from the Union Carbide under the trade designation ERL-4221; bis (3,4-epoxycyclohexyl) adipate, having the following structure:

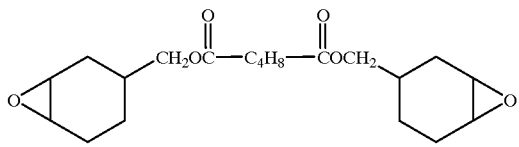

and available from Union Carbide under the trade designation ERL-4299; and vinyl cyclohexene diepoxide, available from Union Carbide under the trade designation ERL-4206.

A discussion of various suitable cycloaliphatic epoxides which are known in the art can be found in the publication entitled *Cycloaliphatic Epoxide Systems*, Union Carbide (1970), the disclosure of which is also incorporated herein by this reference and made a part hereof Mixes of cycloaliphatic epoxides can be employed when desired. The most preferred epoxide is 3,4-epoxycyclohexylmethyl-3,4-epoxycyclohexane carboxylate.

The bisphenol A type epoxies employed as the preferred resin ingredient in the invention are selected from glycidyl ether epoxies containing more than one 1,2 epoxy group per molecule. They are prepared according to methods known in the art by the reaction of 1 mole bisphenol and 2 mole epichlorohydrin in basic media. Generally, the bisphenol A type epoxide particularly useful in this invention will have the formula represented by:

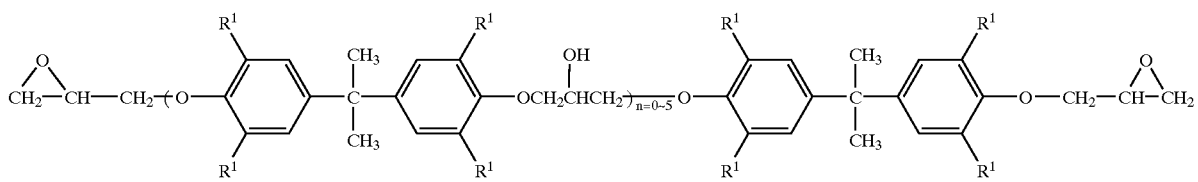

where $R^1$ is H, Br or $CH_3$. The preferred bisphenol A type epoxies in this invention are 2,2-bis(4-hydroxyphenyl) propane-epichlorohydrin copolymer ($R^1$=H) and 2,2'-{(3, 3',5,5'-tetramethyl{1,1'-biphenyl}-4,4'-diyl) bis (oxymethylene)}bisoxirane ($R^1$=$CH_3$), and mixtures thereof The epoxy equivalent weight for the two epoxy resins ranges from about 100 to about 300. Bisphenol F type expoxides are also suitable for use in the present invention.

The epoxy novolac resin employed as the preferred resin ingredient in the invention is selected from glycidyl ether epoxies containing more than one 1,2 epoxy group per molecule. They are prepared according to methods known in the art by the reaction of phenolic resin and epichlorohydrin in basic media. Generally, the epoxy novolac resin particularly useful in this invention will have the formula represented by:

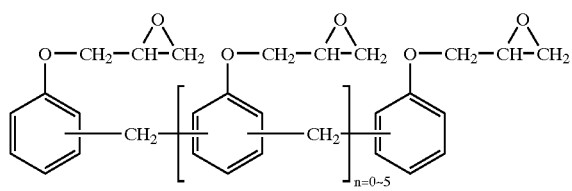

The preferred epoxy novolac resin in this invention is poly(phenyl glycidyl ether)-co-formaldehyde. The epoxy equivalent weight for this epoxy novolac resin ranges from about 200 to about 500.

The crosslinking or hardening agent is preferably in liquid form. If a solid hardening agent is employed, such should be melted when added to the composition. Examples of suitable anhydride hardeners are methyl-tetrahydrophthalic anhydride, hexahydrophthalic anhydride, hexahydro-4-methylphthalic anhydride maleic anhydride, trimellitic anhydride, pyromellitic cianhydride, tetrahydrophthalic anhydride, phthalic anhydride, norbornenedicarboxylic anhydride, nadic methyl anhydride, and methylcyclohexane-1,2 dicarboxylic anhydride. Additional suitable anhydrides which are known in the art can be found, for instance, in H. Lee and K Neville, *Handbook of Epoxy Resin*, McGraw Hill (1967), Chapter 12, the disclosure of which is incorporated herein by this reference and made a part hereof Preferred organic carboxylic acid anhydride hardeners include hexahydrophthalic anhydride, methyl hexahydrophthalic anhydride, and mixtures thereof, having the following respective structures:

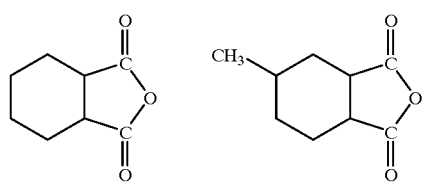

A catalyst, or curing accelerator, is a substance that increases, catalytically, the hardening rate of a synthetic resin. The catalyst is selected to make the curing reaction occur at the desired temperature range. It has been found that the selection of the catalyst can influence the latency of the underfill formulation. Imidazolium salts, onium-borate if compounds, and metal acetylacetonate are suitable catalysts in the present invention to obtain a successful high performance epoxy adhesive material.

The catalytic mechanism of imidazolium salts in epoxide/anhydride systems is similar to imidazole because the imidazolium salt is decomposed into imidazole with the aid of trace moisture at a temperature of 180 to 200° C. Imidazolium salts suitable for use in this invention are characterized by the general formula:

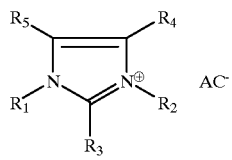

where $R_1$, $R_2$, $R_3$, $R_4$, and $R_5$, can be the same or different and are selected from the group consisting of H, $C_{1-6}$ alkyls, and phenyl. The anionic counter ion $AC^-$ can be any suitable anionic moiety. Preferably, $AC^-$ is selected from the group consisting of $OAC^-$, $AcAc^-$, $C_{1-6}$ alkyl substituted $OAc^-$, $C_{1-6}$ alkyl substituted $I^-$, $BF_4^-$, $PF_6^-$, $AsF_6^-$, $SbF_6^-$, and $CF_3SO_3^-$. The preferred imidazolium compounds are $R_4=R_5=H$; $R_1$, $R_2$, and $R_3$ are selected from the group consisting of H, methyl ethyl, butyl, and phenyl; and $AC^-$ is selected from the group consisting of $I^-$ and $PF_6^-$ and $BF_4^-$.

The general chemical structure of metal acetylacetonate is:

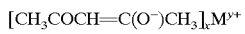

where $M^{y+}$ is selected from the group consisting of the transition metals. X is the ligancy of $[CH_3COCH=C(O^-)CH_3]$ to $M^{y+}$. Y is the number of positive charge of M and is 1 to 6, and will be equal to X. Examples of suitable metal acetylacetonates include cobaltous ($Co^{2+}$) acetylacetonate, cobaltic ($Co^{3+}$) acetylacetonate, coppric, coppnous and ferric ($Fe^{3+}$) acetylacetonate. The mechanism by which metal acetylacetonate catalyzes epoxy/anhydride systems is not currently clear, but its catalytic behavior was reported by J. D. B. Smith, J. Appl. Polym Sci., Vol. 26, 979–986 (1981).

The general chemical structure of onium-borate is:

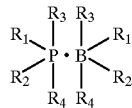

where $R_1$, $R_2$, $R_3$, $R_4$, can be the same or different, and are selected from the group consisting of $C_{1-10}$ alkyls and phenyl. The preferred onium-borate is $R_1=R_2=R_3=$ phenyl; and $R_4$ is selected from the group consisting of phenyl and $C_{1-10}$ alkyls.

The reworkable adhesive of the present invention is made by well-known standard methods.

The thermoplastic adhesive is typically combined with the metal acetate at a ratio of 100 parts adhesive to 0.02–5 parts metal acetate. The preferred ratio is 100 parts adhesive to 0.2 parts metal acetate. The epoxy, crosslinker, and catalyst are typically combined at ratios of 90–110 parts epoxy to 90–110 parts crosslinker, to 2.5–5 parts catalyst; preferably, 100:100:2.5–5. The adhesive/ metal acetate mixture is then combined with the epoxy/ crosslinker/catalyst mixture at ratios of 1:0.25 to 0.25:1, with 1:1 being preferred.

While the invention has been explained in relation to its preferred embodiments, it is to be understood that various modifications thereof will become apparent to those skilled in the art upon reading this specification. The aforementioned examples and embodiments are therefore, to be considered in all respects as illustrative rather than restrictive, and the invention is not to be limited to the details given therein. Therefore, it is to be understood that the invention disclosed herein is intended to cover such modifications as fall within the scope of the appended claims.

What is claimed is:

1. A reworkable high temperature adhesive, comprising the reaction product:
   (a) an adhesive selected from the group consisting of polyetherimides, polyamide-imides, polysulfones, polyethersulfones, silicon-carbon thermosets, polyphenylene sulfides and mixtures thereof;
   (b) a metal acetonate;
   (c) an epoxy resin; and
   (d) a crosslinker wherein the reaction product is stable up to about 400° C. and is reworkable at temperatures of greater than about 400° C.

2. An adhesive as claimed in claim 1, wherein said adhesive is a polyamide-imide.

3. An adhesive as claimed in claim 2, wherein said polyamide-imide is selected from the group consisting of compounds with the structure:

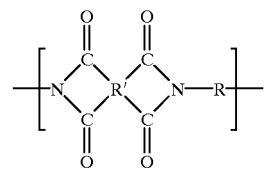

wherein, R' is a tetravalent radical containing at least one six-member aromatic carbon ring, and R is a divalent radical containing an amid group.

4. An adhesive as claimed in claim 2, wherein said polyamide-imide has the structure:

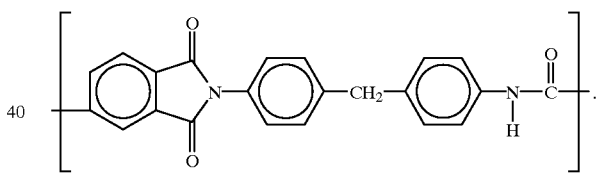

5. An adhesive as claimed in claim 1, further containing a catalyst selected from the group consisting of imidazolium salts and onium borate compounds.

6. An adhesive as claimed in claim 5, wherein said catalyst is selected from the group consisting of imidazolium salts.

7. An adhesive as claimed in claim 6, wherein said imidazolium salt is selected from compounds of the formula:

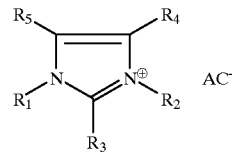

where $R_1$, $R_2$, $R_3$, $R_4$, and $R_5$, can be the same or different and are selected from the group consisting of H, $C_{1-6}$ alkyls, and phenyl; and wherein $AC^-$ is an anionic counterion.

8. An adhesive as claimed in claim 7, wherein $AC^-$ is selected from the group consisting of $OAC^-$, $AcAc^-$, $C_{1-6}$ alkyl substituted $OAc^-$, $C_{1-6}$ alkyl substituted $I^-$, $BF_4^-$, $PF_6^-$, $AsF_6^-$, $SbF_6^-$, and $CF_3SO_3^-$.

9. An adhesive as claimed in claim 8, wherein $R_4=R_5=H$; $R_1$, $R_2$, and $R_3$ are independently selected from the group consisting of H, methyl ethyl, butyl, and phenyl.

10. An adhesive as claimed in claim 9, wherein $AC^-$ is selected from the group consisting of $I^-$ and $PF_6^-$ and $BF_4^-$.

11. The adhesive of claim 1, wherein said adhesive is a polyimide-amide, the epoxy resin is an aliphatic epoxy, the crosslinker is a carboxylic acid anhydride and further containing an imidazolium salt.

12. The adhesive of claim 11, wherein the crosslinker is HHMPA and the catalyst is an imidazolium salt.

13. An adhesive as claimed in claim 1, wherein said metal acetonate is of the formula $[R_1COCH{=}C(O^-)R_2]_x M^{x+}$; where $M^{x+}$ is selected from the group consisting of metals; X is the ligancy of $[R_1COCH{=}C(O^-)R_2]$ to $M^{x+}$ and is also the number of positive charge of M and is 1 to 6; and $R_1$ and $R_2$ selected independently from the group consisting of H, substituted or unsubstituted alkyl, alkyl substituted with phenyl, phenyl, substituted or unsubstituted phenyl substituted with alkyl, and acetyl.

14. An adhesive as claimed in claim 13, wherein M is selected from the group consisting of Group IA–VIA metals and Group IB–VIIIB metals.

15. An adhesive as claimed in claim 14, wherein M is copper.

16. An adhesive as claimed in claim 15, wherein said metal acetonate is selected from the group consisting of metal acetylacetonates.

17. An adhesive as claimed in claim 16, wherein said metal acetonate is selected from the group consisting of copper benzoacetylacetonate and copper acetylacetonate.

18. An adhesive as claimed in claim 17, wherein said metal acetonate is copper benzoacetylacetonate.

19. An adhesive as claimed in claim 1, wherein said epoxy resin is selected from the group consisting of cycloaliphatic epoxys, bisphenol A, bisphenol F, novalac resins; and compounds of the general formula:

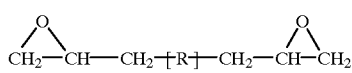

where R is selected from the group consisting of:

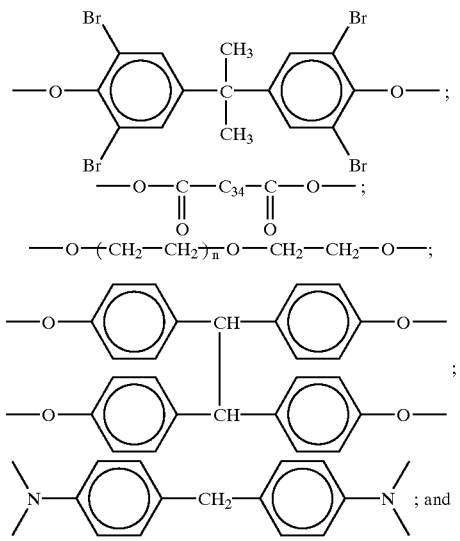

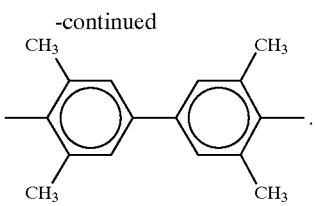

20. An adhesive as claimed in claim 19, wherein said epoxy resin is a cycloaliphatic epoxy.

21. An adhesive as claimed in claim 20, wherein said cycloaliphatic epoxy is selected from the group consisting of non-glycidyl ether epoxides containing more than one 1,2 epoxy group per molecule.

22. An adhesive as claimed in claim 21, wherein said cycloaliphatic epoxy is selected from the group consisting of:

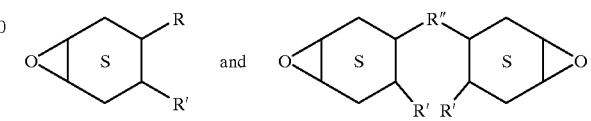

wherein S is a saturated ring structure, R is selected from the group consisting of $CHOCH_2$, $O(CH_2)_nCHOCH_2$ and $OC(CH_3)_2CHOCH_2$ radicals where n=1 to 5, R' is selected from the group consisting of hydrogen, methyl ethyl, propyl, butyl, and benzyl radicals; and R" is selected from the group consisting of O, $CH_2OOC$, $CH_2OOC(CH_2)_4COO$, and $CH_2OOC(CH_2)_4COOCH_2$ radicals.

23. An adhesive as claimed in claim 1, wherein (a) and (b) are first reacted, then (c), (d), and (e) are reacted.

24. An adhesive as claimed in claim 22, wherein R' is selected from the group consisting of hydrogen and methyl.

25. An adhesive as claimed in claim 24, wherein R" is $CH_2OOC$.

26. An adhesive as claimed in claim 20, wherein said cycloaliphatic epoxy is selected from the group consisting of 3,4-epoxycyclohexylmethyl-3,4-epoxycyclohexane carboxylate; vinylcyclohexene dioxide; 3,4-epoxy-6-methyl cyclohexyl methyl-3,4-epoxycyclohexane carboxylate; and dicyclopentadiene dioxide.

27. An adhesive as claimed in claim 20, wherein said cycloaliphatic epoxy is selected from the group consisting of 3,4-epoxycyclohexylmethyl-3,4-epoxycyclohexane carboxylate; bis(3,4-epoxycyclohexyl) adipate; and vinyl cyclohexene diepoxide.

28. An adhesive as claimed in claim 27, wherein said cycloaliphatic epoxy is 3,4-epoxycyclohexylmethyl-3,4-epoxycyclohexane carboxylate.

29. An adhesive as claimed in claim 1, wherein said crosslinker is a carboxylic acid anhydride.

30. An adhesive as claimed in claim 29, wherein said crosslinker is selected from the group consisting of methyl-tetrahydrophthalic anhydride, hexahydrophthalic anhydride, hexahydro-4-methylphthalic anhydride maleic anhydride, trimellitic anhydride, pyromellitic cianhydride, tetrahydrophthalic anhydride, phthalic, anhydride, norbornenedicarboxylic anhydride, nadic methyl anhydride, and methylcyclohexane-1,2 dicarboxylic anhydride.

31. An adhesive as claimed in claim 30, wherein said crosslinker is selected from the group consisting of hexahydrophthalic anhydride and methyl hexahydrophthalic anhydride.

32. An adhesive as claimed in claim 1, wherein said thermoplastic is reacted with said metal acetonate at a ratios of 100 parts thermoplastic to 0.02–5 parts metal acetonate.

33. An adhesive as claimed in claim 32, wherein said epoxy, said crosslinker, and said catalyst are reacted at ratios of 90–110 parts epoxy to 90–110 parts crosslinker, to 2.5–5 parts catalyst.

34. A reworkable high temperature adhesive comprising the reaction product of:

(a) an adhesive comprising a polyamide-imide;

(b) a metal acetonate of the formula $[R_1COCH=C(O^-)R_2]_x M^{x+}$; where $M^{x+}$ is selected from the group consisting of metals; X is the ligancy of $[R_1COCH=C(O^-)R_2]$ to $M^{x+}$ and is also the number of positive charge of M and is 1 to 6; and $R_1$ and $R_2$ selected independently from the group consisting of H, substituted or unsubstituted alkyl, alkyl substituted with phenyl, phenyl, substituted or unsubstituted phenyl substituted with alkyl, and acetyl;

(c) an epoxy resin epoxy resin is selected from the group consisting of cycloaliphatic epoxys, bisphenol A, bisphenol F, novalac resins; and compounds of the general formula:

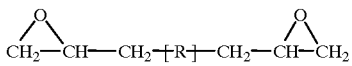

where R is selected from the group consisting of:

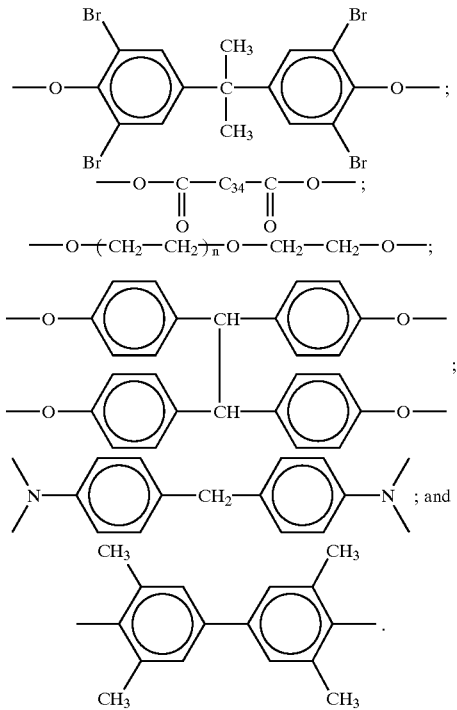

(d) a carboxylic acid anhydride; and (e) a catalyst selected from the group consisting of imidazolium salts and onium borate compounds wherein the reaction product is stable up to about 400° C. and is reworkable at temperatures of greater than about 400° C.

35. An adhesive as claimed in claim 34, wherein said polyamide-imide is selected from the group consisting of compounds with the structure:

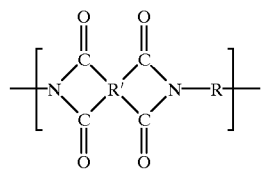

wherein, R' is a tetravalent radical containing at least one six-member aromatic carbon ring, and R is a divalent radical containing an amid group.

36. An adhesive as claimed in claim 34, wherein said polyamide-imide has the structure:

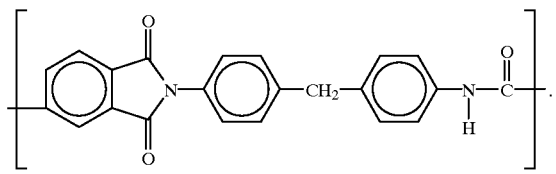

37. An adhesive as claimed in claim 34, wherein M is selected from the group consisting of Group IA–VIA metals and Group IB–VIIIB metals.

38. An adhesive as claimed in claim 37, wherein said metal acetonate is selected from the group consisting of copper benzoacetylacetonate and copper acetylacetonate.

39. An adhesive as claimed in claim 34, wherein said epoxy comprises a cycloaliphatic epoxy selected from the group consisting of:

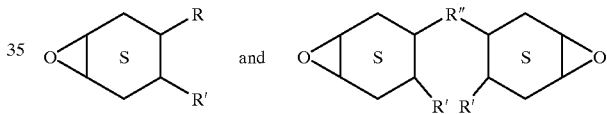

wherein S is a saturated ring structure, R is selected from the group consisting of $CHOCH_2$, $O(CH_2)_nCHOCH_2$ and $OC(CH_3)_2CHOCH_2$ radicals where n=1 to 5, R' is selected from the group consisting of hydrogen, methyl ethyl, propyl butyl, and benzyl radicals; and R" is selected from the group consisting of O, $CH_2OOC$, $CH_2OOC(CH_2)_4COO$, and $CH_2OOC(CH_2)_4COOCH_2$ radicals.

40. An adhesive as claimed in claim 39, wherein said cycloaliphatic epoxy is selected from the group consisting of 3,4-epoxycyclohexylmethyl-3,4-epoxycyclohexane carboxylate; vinylcyclohexene dioxide; 3,4-epoxy6-methyl cyclohexyl methyl-3,4-epoxycyclohexane carboxylate; and dicyclopentadiene dioxide.

41. An adhesive as claimed in claim 40, wherein said cycloaliphatic epoxy is 3,4-epoxycyclohexylmethyl-3,4-epoxycyclohexane carboxylate.

42. An adhesive as claimed in claim 34, wherein said crosslinker is selected from the group consisting of methyltetrahydrophthalic anhydride, hexahydrophthalic anhydride, hexahydro-4-methylphthalic anhydride maleic anhydride, trimellitic anhydride, pyromellitic cianhydride, tetrahydrophthalic anhydride, phthalic anhydride, norbornenedicarboxylic anhydride, nadic methyl anhydride, and methylcyclohexane-1,2 dicarboxylic anhydride.

43. An adhesive as claimed in claim 42, wherein said crosslinker is selected from the group consisting of hexahydrophthalic anhydride and methyl hexahydrophthalic anhydride.

44. An adhesive as claimed in claim 34, wherein said catalyst is selected from the group consisting of imidazolium salts of the formula:

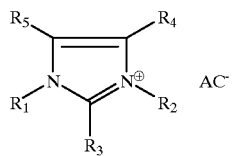

where $R_1$, $R_2$, $R_3$, $R_4$, and $R_5$, can be the same or different and are selected from the group consisting of H, $C_{1-6}$ alkyls, and phenyl; and wherein $AC^-$ is an anionic counterion selected from the group consisting of $I^-$ and $PF_6^-$ and $BF_4^-$.

45. An adhesive as claimed in claim 44, wherein $R_4=R_5=H$; $R_1$, $R_2$, and $R_3$ are independently selected from the group consisting of H, methyl ethyl, butyl, and phenyl.

46. A reworkable high temperature adhesive obtained as a reaction product comprising:
   (a) an adhesive selected from the group consisting of polyetherimides, polyamide-imides, polysulfones, polyethersulfones, silicon-carbon thermosets, polyphenylene sulfides and mixtures thereof;
   (b) a metal acetylacetonate;
   (c) an epoxy resin; and
   (d) a crosslinker wherein the reaction product is stable up to about 400° C. and is reworkable at temperatures of greater than about 400° C.

* * * * *